US005980640A

United States Patent [19]

Nurmi et al.

[11] Patent Number: 5,980,640

[45] Date of Patent: Nov. 9, 1999

[54] METHOD FOR RECOVERING AN ORGANIC COMPOUND FROM SOLUTIONS

[75] Inventors: Juha Nurmi, Pinjainen; Olli-Pekka Eroma, Kotka; Kristian Eriksson, Turku, all of Finland

[73] Assignee: Xyrofin Oy, Helsinki, Finland

[21] Appl. No.: 08/609,494

[22] Filed: Mar. 1, 1996

[30] Foreign Application Priority Data

Mar. 1, 1995 [FI] Finland .................................... 950957
Apr. 28, 1995 [FI] Finland .................................... 952065

[51] Int. Cl.$^6$ ................................ C13F 1/02; C13F 1/00; C13F 3/00

[52] U.S. Cl. ................................ 127/60; 127/30; 127/58; 127/61

[58] Field of Search ................................ 127/30, 58, 60, 127/61; 568/923; 546/339; 554/208, 211; 562/486; 23/295

[56] References Cited

U.S. PATENT DOCUMENTS

| | | | |
|---|---|---|---|
| 3,780,017 | 12/1973 | Spalt et al. | 260/209 R |
| 3,784,488 | 1/1974 | Steinhaur et al. | 260/2.5 M |
| 3,981,739 | 9/1976 | Dmitrovsky et al. | 127/60 |
| 4,016,001 | 4/1977 | Hoks | 127/16 |
| 4,075,406 | 2/1978 | Melaja et al. | 536/1 |
| 4,168,988 | 9/1979 | Riehm et al. | 127/37 |
| 4,199,373 | 4/1980 | Dwivedi et al. | 127/60 |
| 4,297,146 | 10/1981 | Mise et al. | 127/60 |
| 4,342,603 | 8/1982 | Daniels | 127/30 |
| 4,357,172 | 11/1982 | Edwards | 127/60 |
| 4,534,800 | 8/1985 | Winstrøm-Olsen | 127/12 |
| 4,595,418 | 6/1986 | Yoshino | 127/30 |
| 4,622,417 | 11/1986 | Barnett et al. | 560/117 |
| 4,631,129 | 12/1986 | Heikkila | 210/635 |
| 4,634,472 | 1/1987 | Niekamp et al. | 127/60 |
| 4,640,717 | 2/1987 | Shukla et al. | 127/58 |
| 4,681,639 | 7/1987 | Hinck | 127/30 |
| 4,816,079 | 3/1989 | Ahrens et al. | 127/60 |
| 4,888,060 | 12/1989 | Niekamp et al. | 127/60 |
| 4,895,601 | 1/1990 | Binder et al. | 127/58 |
| 4,938,804 | 7/1990 | Heikkila et al. | 127/60 |
| 4,955,363 | 9/1990 | Harju et al. | 127/46.1 |
| 5,004,507 | 4/1991 | Binder et al. | 127/58 |
| 5,076,853 | 12/1991 | Leleu | 127/58 |
| 5,084,104 | 1/1992 | Heikkila et al. | 127/46.2 |
| 5,133,807 | 7/1992 | De Cremoux | 127/15 |
| 5,230,742 | 7/1993 | Lillard, Jr. et al. | 127/46.1 |
| 5,281,279 | 1/1994 | Gil et al. | 127/46.1 |
| 5,340,403 | 8/1994 | Fields et al. | 127/37 |

FOREIGN PATENT DOCUMENTS

| | | | |
|---|---|---|---|
| 1 643 940 | 7/1967 | Germany . | |
| WO 81/02420 | 9/1981 | WIPO | C07C 101/12 |

OTHER PUBLICATIONS

Horn (Jun. 1977) "Dextrose: An Alternative to Sucrose in Panned Confections", *The Manufacturing Confectioner for Jun. 1977*, 79–86.

*Primary Examiner*—Mark L. Bell
*Assistant Examiner*—Patricia L. Hailey
*Attorney, Agent, or Firm*—Scully, Scott, Murphy & Presser

[57] ABSTRACT

The invention relates to a method for recovering a crystallizable organic compound from solutions containing said compound. In accordance with the method, the compound is crystallized substantially by way of nucleation from a solution having high viscosity and high supersaturation in respect of the compound to be recovered, and the formed crystals are recovered.

44 Claims, No Drawings

METHOD FOR RECOVERING AN ORGANIC COMPOUND FROM SOLUTIONS

I. FIELD OF THE INVENTION

The present invention relates to a method by which a crystallizable organic compound can be recovered from solutions containing said compound. In particular, the invention relates to a method by which water-soluble organic compounds can be crystallized from supersaturated aqueous solutions having very high viscosity and then recovered from the solutions.

II. BACKGROUND OF THE INVENTION

The two principal steps of crystallization are the formation of crystal seeds (nucleation) and crystal growth. In most industrial processes, crystallization is primarily based on crystal growth, not nucleation.

The state of the art with respect to crystallization is represented, for example, by Mathlouthi, M. and Reiser, P. (ed.), *Sucrose, Properties and Applications*, Blackie Academic & Professional, Suffolk, Great Britain, 1995, p. 49 ff. This disclosure explains the crystallization mechanism with respect to both nucleation and crystal growth. With regard to the industrial crystallization of sucrose, this publication states, for instance, that one must avoid concentrating the solution up to the nucleation zone, i.e. the zone whereat spontaneous nuclei formation readily occurs (p. 58); one must avoid the creation of an uncontrolled number of seeds (p. 59); the crystals to mother liquor ratio cannot be increased beyond a certain value (pp. 59–60); and crystallization should be carried out in the metastable zone not too close to the nucleation zone and the saturation curve (pp. 60–61, and pp. 63–64). The metastable zone is the zone where spontaneous crystal formation will occur only if crystals are present. It is emphasized that in this zone no new crystals are formed in the absence of seeds. Furthermore, according to this publication (cf. e.g. pp. 57 and 58) impurities decrease the crystal growth rate and may even block the growth completely.

With an increase in supersaturation and a decrease in the temperature of the solution, the viscosity of the solution also increases, thus slowing down and eventually completely blocking diffusion of the molecules through the liquid layer surrounding the crystals or crystal nuclei to the crystal surface, and hence prior art processes based on crystal growth are no longer possible. In accordance with the prior art, high viscosity has also been regarded as a downright impediment to the separation of crystals from the mother liquor.

In respect to sucrose crystallization, these problems have also been discussed in the above publication Mathlouthi, M. and Reiser, P. (ed.), *Sucrose, Properties and Applications.*

The methods for recovering sucrose employed in the sugar industry typically comprise three successive crystallization steps. In the last step, which is known as 'c' crystallization, the sucrose content of the starting material syrup is about 73–75% on dry substance; this crystallization method is slow and difficult, and yet the sucrose purity (% of sucrose on dry substance) of the run-off, i.e. molasses, obtained therefrom is still typically as high as about 58%.

There are several methods by which it is sought to improve the sucrose yield, i.e. to diminish the sucrose purity of molasses. Such methods include the Quentin and Steffen methods and the molasses fractionation methods of the type described in Finnish Patent 77 845 (Suomen Sokeri Oy; Heikkilä, Melaja, Millner, Virtanen; corresponds to international published application WO 81/02420). Such fractionation methods enable a fraction enriched with betaine wherefrom betaine can be recovered to be obtained from molasses.

In conventional methods, it has only been possible to crystallize xylose if the xylose purity has been at least about 70% by weight on dry substance. In that connection, it has been necessary to first purify the xylose-containing solution obtained, for example, as a result of hydrolysis of vegetable-derived material to the required degree of purity by various ultrafiltration, ion exchange, decolouring, ion exclusion or chromatographic separation methods or combinations of these; furthermore, auxiliary solvents diminishing the solubility of xylose have been employed to crystallize xylose.

The above xylose separation, purification and crystallization methods have been described, for instance, in U.S. Pat. No. 4,631,129 (Heikkilä, H.; Suomen Sokeri Oy), U.S. PAt. No. 4,075,406 (Melaja, A. J. & Hämäläinen, L.; Suomen Sokeri Oy), U.S. Pat. No. 5,084,104 (Heikkilä, H. & Hyöky, G.; Cultor, Ltd.) and U.S. Pat. No. 4,168,988 (Riehm, T. & Hofenk, G; Institut voor Bewaring en Verwerking van Landbouwprodukten) and the publications referred to therein.

When xylose is prepared by hydrolyzation of xylan, an alternative to the above methods is to purify the xylan prior to its hydrolyzation into xylose to obtain a xylose solution of sufficient purity. Also this procedure is very complex and cumbersome, as will be apparent from Browning, B. L., *Methods of Wood Chemistry*, II, Interscience Publishers, New York, 1967, and Fry, S. C., *The Growing Plant Cell Wall: Chemical and Metabolic Analysis*, Longman Scientific & Technical, England, 1988.

In accordance with German Offenlegungsschrift 1,643, 940 (Eickenmeyer, R. & Scholler, H.), crystalline xylose is recovered from a hydrolysate of pentosan- and cellulose-containing natural substances by crystallization from a syrup containing at least about 70% of xylose. The syrup is introduced into a crystallizer at 60–70° C., and a crystal mass containing 15–33% of xylose on the amount of xylose supplied to the crystallizer is taken from the crystallizer at 48–52° C. Crystals are separated from this crystal mass by centrifugation, and the mother liquor, the amount of which is 300–100% of the fresh syrup supplied to the system, is combined with the starting material hydrolysate. The resultant mixture of mother liquor and hydrolysate is treated in a cation exchanger and an anion exchanger, and after a subsequent decolouring treatment the mixture is evaporated in order to obtain a syrup to be supplied to the crystallizer. In addition to cumbersome purification treatments, the method thus comprises very extensive recycling. In accordance with this publication, the small amount of xylose obtained in one crystallization (the small yield as compared with the xylose supplied to the crystallizer) is due to fact that when the temperature falls below about 48° C., the crystallization rate will be very small on account of the fact that the viscosity of the solution substantially increases when the temperature drops.

U.S. Pat. No. 3,981,739 to Dmitrovsky et al. relates to a method of continuously crystallizes sugars (sucrose, dextrose, fructose, lactose, carbohydrates). The method involves controlled growth of crystals in two-stage evaporative crystallization starting from seed crystals of small size. The crystals in the first stage are substantially larger than the seed crystals, and crystals of increased size are produced in the second stage.

U.S. Pat. No. 4,199,373 to Dwivedi et al. relates to a process for manufacturing free-flowing mixtures of fructose and glucose avoiding the disadvantages of earlier processes (such as the need of sophisticated machinery and careful control, high energy costs and low yield). The process is a solidification method; it includes no separation of crystals and mother liquor. A highly concentrated solution is seeded and permitted to stand (thus allowing crystallization to take place) at a specific temperature and relative humidity, recovered, dried and ground. Too low a concentration results in a pasty mass, too high a concentration results in a glassy mixture. It is essential that the surrounding air has a relative humidity below 50% and a temperature between 50–90° F. (10–32° C.) .

Other total solidification processes are disclosed, for example, in U.S. Pat. No. 4,297,146 to Mise et al.; U.S. Pat. No. 4,595,418 to Yoshino; and U.S. Pat. No. 4,640,717 to Shukla et al.

U.S. Pat. No. 4,634,472 to Niekamp et al. provides a process for manufacturing an enriched fructose syrup. In this process, a feed syrup (75–89% dry solids concentration) temperature which is appropriate for crystallization of glucose is established. It is well known in the art that the easy crystallization of glucose, even at low purity, is often a problem, as for instance in the case of honey (typical solid concentration 81–85%, about 40% of glucose and about 30% fructose on dry solids). It is also known (see Harold E. Horn, "Dextrose: An Alternative to Sucrose in Panned Confections", *The Manufacturing Confectioner* for 1977) that glucose crystallization is increasingly inhibited at viscosities of 10,000–100,000 cP (10–100 Pas). Calculated from Example 1 of U.S. Pat. No. 4,634,472, the crystallization viscosity is only about 2000 cP, which represents a very low viscosity solution. No water can be used as a diluent in the process according to U.S. Pat. No. 4,634,472 (Column 5, lines 20–25), since the crystals would dissolve.

U.S. Pat. No. 4,816,079 to Ahrens et al. relates to a process for continuous crystallization of dextrose monohydrate. The process is, in principle, a traditional cooling crystallization method based on crystal growth. Part of the feeding syrup is subjected to a shearing process for a period of 0.01–2 seconds to initiate nucleation for producing seed crystals for the process.

Accordingly, there is need for an economical and efficient process to achieve a high recovery of crystalline product from a solution containing same, especially a source, having lower levels of crystallizable product than are directly processable under comparable conditions to achieve the same yield.

It is then a principal object of the invention to achieve an improvement in overall yield of recovered crystallizable organic compounds from solutions containing same.

It is a further object to economically utilize in such processes material streams impure in crystallizable organic compounds contained therein.

It is also an object to employ run-off or recycle stream from industrial processes containing crystallizable organic compounds as a source for the efficient recovery of such compounds in good yield.

III. SUMMARY OF THE INVENTION

It has now been found that crystallizable organic compounds that form solutions having high viscosity can be recovered from such solutions by crystallization when the supersaturation value is sufficiently high and when the crystallization is performed substantially by way of nucleation, i.e. in such a way that crystal growth is not significant in the process. Thus the compounds can be crystallized even from comparatively impure solutions wherefrom they could not previously been crystallized. In the context of the present description and claims, high viscosity denotes a viscosity at which crystal growth is substantially retarded. Specifically, in the present invention a solution is considered as having a high viscosity if its viscosity is in the range from about 100,000–1,000,000 cP (100–1000 Pas).

The invention thus affords a method for recovering a crystallizable organic compound from solutions containing said compound, being characterized in that the compound is crystallized substantially by way of nucleation from a solution having high viscosity and high supersaturation in respect of the compound to be recovered, and the formed crystals are recovered.

IV. DETAILED DISCUSSION OF THE INVENTION

The crystallization of the invention is preferably carried out beyond the metastable zone, i.e., employing the terminology of Mathlouthi, M. and Reiser, P. (ed.), *Sucrose, Properties and Application* for instance, in the nucleation zone which, in accordance with said publication should be avoided in the crystallization of sucrose, for example.

In the method of the invention, nucleation is enhanced by effective stirring, thus enabling the nucleation to occur spontaneously. The stirring is effected as vigorously as the high viscosity permits to achieve efficient continuous intermixing of portions of the crystallization mass into and from the higher shear zones in which nucleation is favored so to maximize crystallization through the mass. In this way, the solidification of the crystallization mass is avoided, and the nuclei are able to develop crystal shape and grow until crystal growth is blocked, whereby the highest yields are realized. To induce nucleation, seed crystals may also be added to the supersaturated solution. The final crystal size is typically limited to about 10 to 120 $\mu$m. The improvement in recovery of the crystallizable compound achieved by the present invention is fundamentally based on a nucleation mechanism in very viscous solutions under continuous intermixing by which overall crystallization yield is maximized.

After nucleation has started, the high viscosity of the mother liquor of the suspension (i.e. crystallization mass) obtained substantially prevents crystal growth and discharge of the supersaturation state; yet nucleation continues on account of effective stirring. During the first period of the nucleation process of the present invention, the suspension is cooled down to reach and maintain a high supersaturation of the mother liquor. Thereafter, the temperature of the crystallization mass and concentration of total solids are practically constant. The supersaturation of the mother liquor is maintained high during the entire crystallization phase, i.e., the system is continually maintained substantially above the metastable range.

In the present description and claims, supersaturation of the solution denotes its apparent supersaturation in respect of the organic compound to be recovered, i.e. the dimensionless ratio of the measured content and solubility of said compound, which is calculated from the equation:

$$s = \frac{\text{content of compound in sample solution}}{\text{solubility of compound at temperature of sample solution}}$$

wherein s is supersaturation, and the unit of measurement for the content and solubility of the compound is g of pure compound/100 g of solvent. Also the terms "supersaturated" and "supersaturation" singly refer to the saturation of the solution in respect of the compound to be recovered. The purity of the substance denotes its percentage in the dry substance.

High supersaturation denotes a supersaturation at which nucleation process is dominant and crystal growth is inhibited. Typically, in the present invention a solution is considered having a high supersaturation when s is between 1.4 and 4.

It is known in the prior art that a relatively high supersaturation is needed for nucleation, and this is most effectively maintained at low viscosity by applying strong mixing. If nucleation as such is preferred, then obvious operation conditions would be a relatively low viscosity and vigorous mixing. Contrary to that, high viscosities are used in the present invention, whereby superior recovery of the crystallizable compound can be obtained.

In accordance with the prior art, also the problems involved in the separation of a small-crystal product from a mother liquor at high viscosity of the crystallization mass have hindered the industrial application of crystallization based primarily on nucleation. Strong nucleation (spontaneous crystal formation) is therefore typically regarded as a failure in traditional crystallization processes. In accordance with an additional aspect of the invention, the small-crystal product produced in the nucleation can nonetheless be separated from the crystallization mass when the viscosity of the crystallization mass is decreased immediately before the recovery of crystals or in connection with the recovery of crystals. Viscosity can be decreased, for example, by heating the crystal mass and/or diluting it either with a dilute starting material solution or the solvent contained therein. Also addition of another solvent in which the crystals do not substantially dissolve is possible; for example in the recovery of sucrose, glycerol could be used as such a solvent.

A special embodiment of the invention is the recovery by filtration of a small-crystal fraction obtained by nucleation.

In typical prior art crystallization processes, considerable amounts of the product are lost in the final mother liquors. The present invention leads to remarkable additions in the recovery of the desired product from the mother liquor. Recovered material can be further refined by traditional crystallization processes. Typical improvement achieved by the present invention in total yield is 5–30% or even more compared to prior art processes. Total yield up to 80% can be obtained from aqueous solutions where traditional crystallization is ineffective.

The method of the invention is particularly suitable for the recovery of carbohydrates, which preferably are readily crystallizable such as aldoses and alditols, for example sugars and sugar alcohols, and hydroxy and amino acids and betaine from aqueous solutions thereof. The term "aqueous solution" as employed herein denotes a medium wherein the crystallizable compound is initially dissolved thereby providing a single, homogeneous continuous phase containing a sufficient concentration of crystallizable compounds such that when the solution is concentrated to its supersaturated state nucleation readily occurs. It is understood that the aqueous solution may comprise other substances miscible therewith either as impurities in the feed or as adjuvants to facilitate further processing.

Since the method is capable of recovering these compounds even from substantially impure solutions, it is suitable for use in the recovery of organic compounds from biomass-derived aqueous solutions. Such solutions include molasses and vinasse, biomass hydrolysates or parts thereof or concentrates obtained therefrom, such as cooking liquors of the pulp industry. Such aqueous solutions also include run-offs (mother liquors wherefrom crystals have been separated) obtained in the present-day industrial crystallization processes in which the purity of the compound to be recovered in the raw material solution is comparatively high and the impurities are discharged in the run-off. Furthermore, this method is suitable for the recovery of products prepared by way of fermentation, such as gluconates, glutamates and lactic acid, from the fermentation solutions thereof.

The method of the invention is suitable for the recovery of, for example, the following compounds: xylose, mannose, xylitol, mannitol, lactose, lactitol, sucrose, glucose, fructose, maltose, maltitol, iso-maltose, isomaltulose, lactulose, α-D-glucopyranocyl-(1→6)mannitol, α-D-glucopyranocyl (1→6)sorbitol, β-cyclodextrin, itaconic acid, citric acid, betaine, inositol, 1,4-anhydroglucitol.

The method of the invention is particularly advantageous in cases where the crystallizable substance has been recovered from solutions by crystallization by known methods to the extent that is technically possible or economically feasible. In other words, the method is particularly advantageous in recovering a crystallizable substance from solutions having low purity of the substance.

The solution from which the organic compound is recovered by the method of the invention is first brought to a state of sufficient supersaturation to produce nucleation. Typically, this is achieved by concentration and/or cooling. A preferred concentration method is evaporation under subatmospheric pressure. The solution can be concentrated, for example, to a dry substance content of 75–98% by weight; the preferred dry substance content is dependent on the solution to be treated and can be 82–95% by weight, for instance. The degree of supersaturation is maximized under the conditions obtainable within the limit of workable viscosity.

To produce crystals from a supersaturated solution, cooling is most often employed, the quality and crystallization propensity of the solution to be treated affecting the cooling time and rate. In the nucleating step, the rate of cooling of the supersaturated solution and the application of working energy to the mixing process is interrelated in practice to avoid solidification of the crystallization mass and to limit crystal growth to provide crystals generally in the range of not greater 10–100 $\mu$m, for example, while promoting further nucleation of the crystallization mass. In general too high a local shear rate, without effective intermixing, can lead to the solidification of the crystallization mass and should be avoided. At a given viscosity and power input, crystal size distribution is conveniently controlled by the cooling rate. Higher purity sources may be cooled more quickly, whereas sources with greater impurities or natural inhibitors may require a slower rate.

Prior to the initiation of the cooling, finely ground seed crystals of the compound to be recovered are preferably added to the solution; the crystallization can, however, also be initiated by spontaneous seeding. The term "full seeding" employed hereinbelow in connection with seeding is commonly known in the art (see "Beet-Sugar Technology", 3d Edition, edited by R. A. McGinnis (1982) pp. 371–481) and is calculated from the size of seed crystals, the crystal size in the desired end product, and the yield, provided that the number of crystals does not change.

The solution brought to the state of supersaturation required by nucleation, and the suspension formed by such a solution and the crystals contained therein, will also be termed crystallization mass in the following.

The method of the invention is particularly advantageous and is representatively described in the recovery of xylose from solutions having a comparatively low xylose content on dry substance, i.e. from about 30 to 50% by weight on dissolved dry substance. In that case, the separation processes involved in the prior art processes can be considerably lessened or totally eliminated, and the use of auxiliary solvents can also be eliminated, thus making the method of the instant invention essentially more inexpensive than the prior art methods, and xylose can be recovered in the form of a crystalline product from xylose solutions that are difficult to purify, for example, by chromatographic separation which, therefore, does not yield such xylose purities as are required in the prior art crystallization methods. In particular, the object of the invention is such a method for recovery of xylose from hydrolysis products of biomass, which may also be xylose-containing by-product fractions obtained in the wood processing industry, such as sulphite cooking liquor or a part thereof or a concentrate obtained therefrom, for instance, a concentrate chromatographically produced from sulphite cooking liquor or a prehydrolysate portion of cooking liquor or a posthydrolysate or ultrafiltration permeate thereof.

In the case of the solution to be treated being an aqueous solution of xylose (xylose purity about 30–50%), in accordance with a preferred embodiment of the invention, the amount of seed crystals to be used is high, at least 10-fold compared with full seeding. Thus the supersaturation during the crystallization is 1.4–3.0, preferably 1.5–2.5. The crystal size (length of crystals) obtained is typically 10–100 $\mu$m.

A preferred way of carrying out crystallization in accordance with the invention on xylose is cooling of the seeded crystallization mass at a relatively high rate, in a time of about 10–50 hours or less, to the supersaturation value required by nucleation. Herein the temperature of the crystallization mass is typically 20–50° C., depending on the dry substance content of the crystallization mass, and the viscosity of the crystallization mass is in the range 100–600 Pas.

The suspension is stirred until a sufficient degree of crystallization (yield, decrease in xylose purity of mother liquor) has been reached. For instance, a crystallization vessel equipped with 1.3–1.7 long (from the shaft to the top) mixer blades with high shear zones is typically utilized at a rotation velocity initially of 3–6 rpm, and at the high viscosity period, 0.5–3 rpm. Shear rate relative to intermixing efficiency is controlled to avoid solidification of the mass while maintaining nucleation. Typically, the power applied to the mixer is between about 100 $W/m^3$ and about 800 $W/m^3$. Such a range provides effective mixing whereby the nucleated material is transported to the interior of the crystallization mass. Precipitation period of 1–4 days or even less can reduce (convert to crystalline product) xylose level in the mother liquor to about 20% or less.

Thereafter the supersaturation of the crystallization mass is decreased by increasing the temperature and/or diluting the crystallization mass with water or a xylose-containing solution without significant crystal dissolution until the viscosity of the crystallization mass has decreased to a sufficient degree for effective separation of crystallized matter. A typical viscosity of the crystallization mass is 5–100 Pas after decreasing the viscosity. The crystals can be separated by filtration, decanting, centrifugation etc., preferably by filtration. The mother liquor (i.e. run-off) thus separated has been reduced to a very low xylose content (as low as 16% on dry substance). The xylose purity of the crystal fraction obtained is typically 60–90% on dry substance, depending on the xylose purity of the crystallization mass and the execution of the process, and said fraction can easily be purified, if necessary, by normal crystallization techniques, for instance. The purity of the crystal fraction obtained by the method of the invention can be improved by displacing a quantity of the mother liquor with a solvent or with air.

It has not been possible to crystallize xylose from solutions having a purity of less than about 70% by the prior art methods without subjecting the solutions to cumbersome purification treatments. The novel method now developed is capable of achieving crystallization with xylose purities as low as about 30% on dry substance.

According to another preferred embodiment of the invention, sucrose can be crystallized from aqueous solutions thereof, such as from molasses obtained in the sugar industry. In this case, a small amount of glycerol (or some other organic solvent that may be present in final molasses) can be added to raw molasses before feeding it to the crystallization process.

The solution thus obtained is evaporated under reduced pressure to a dry substance content (DS) of about 90–95 g/100 g, and the crystallization mass obtained at about 80–90° C. is transferred into a crystallizer.

The crystallization mass is seeded with ground sucrose (mean crystal size from 5 to 10 μm) at 70–90° C. Seed crystals are used in an amount that is up to 100-fold compared with the case where the crystallization is based mainly on the growth of crystals. The seed crystal amount is not very essential, since many new crystals are formed by nucleation during effective mixing.

Crystallization is carried out in a crystallizer for about 10 days. The crystallization mass is cooled to about 50° C. in 2–3 days and stirred at that temperature for about 7 days before the preparations for filtration. The viscosity of the crystallization mass is below 800 Pas at its highest, and it decreases as the crystallization proceeds.

Before filtration, the viscosity of the crystallization mass is lowered by increasing the temperature by 5–15° C. and/or optionally adding glycerol and/or water in an amount of up to about 10% by weight. The crystal size obtained is typically about 10–50 μm. The crystal fraction is preferably recovered by pressure filtration.

The crystal fraction is preferably recovered by pressure filtration. The effective sucrose yield obtained after filtration in the experiments so far performed has been about 30% of the sucrose contained in the starting molasses having a sucrose purity of 40–60% based on the dry substance content (DS). The yield can be improved by further optimizing the process conditions.

The filtration to recover crystalline product may be conveniently effected with a pressure filter, e.g. Larox filter with 10–20 plates, employing a fiber cloth of moderate porosity separating at 2–16 bar and 0.5 to 1.0 hour pressing time.

The special embodiments of the method of the invention will be illustrated in greater detail by means of the following examples, which are not intended to limit the scope of the invention.

In some of the examples the concentration of the crystallizable compound is increased by addition of the pure compound to demonstrate the workability of the invention at different purities.

The dry substance contents were determined by the Karl Fischer titration method (DS) or by the refractometric method (RDs).

Carbohydrates were analyzed by liquid chromatography (HPLC) employing columns in which the ion exchange resin was in the $Na^+$ and $Pb^{2+}$ forms, or with PEDLC (i.e., HPLC employing a pulse electrochemical detector). Color was determined by the adapted ICUMSA method [cf. *Sugar Analysis*; Official and Tentative Methods Recommended by the International Commission for Uniform Methods of Sugar Analysis (ICUMSA), ed. Schneider, F., ICUMSA, Peter-borough, England, 1979, pp. 125–128] at pH 5 (example of xylose crystallization) and pH 7 (other examples) and by performing the measurement from a filtered solution (0.45 μm) at 420 nm.

In the examples that follow, the total (i.e. true) yield of filtration is calculated from the crystallization mass, filtration run-off and crystal cake purities using the following formula:

$$\text{True Yield of Filtration} = \left(\frac{Q_{mass} - Q_{runoff}}{Q_{crystal} - Q_{runoff}}\right) \times \left(\frac{Q_{crystal}}{Q_{mass}}\right) \times 100\%$$

wherein $Q_{mass}$ is the purity of the crystallization mass; $Q_{crystal}$ is the purity of the crystal cake; and $Q_{run\text{-}off}$ is the purity of the filtration run-off.

For example, the yield of xylose in Example 1, using the data from Table 1, is calculated as follows:

$$\text{Yield of xylose} = \frac{40.1 - 22.4}{74.5 - 22.4} \times \frac{74.5}{40.1} \times 100\% = 63.1\%$$

The yield of dry substance (expressed in w/w %) is calculated in the following examples using the following formula:

Yield of dry substance=Yield of crystallizable compound x $$\frac{Q_{mass}}{Q_{crystal}}$$

wherein $Q_{mass}$ and $Q_{crystal}$ are as defined above.

The filtration effective yield is calculated with 100% crystal purity. This tells how much pure compound can be refined from the low purity crystal cake.

EXAMPLE 1

Crystallization of Xylose 150 l of a xylose fraction obtained from a magnesium-base sulphite cooking liquor of beechwood by chromatographic separation (substantially in accordance with the first step of the process described in U.S. Pat. No. 4,631,129), containing about 105 kg of dry substance and having a xylose purity of 39.3%, was evaporated in subatmospheric pressure at about 60° C. to a volume of about 80 l. This xylose fraction was seeded at 58° C. with 25 g of ground xylose at a supersaturation value of 2.24, and the crystallization mass was transferred into a 100 l crystallizer.

The crystallization mass was subjected to linear cooling from 58° C. to about 20° C. with simultaneous stirring (viscosity 190 Pas measured with a Brookfield viscometer, type RVDV-I+) in about 25 hours, during which time the supersaturation decreased initially to 1.66 in 3.7 hours, thereafter increased to 1.93 (time from seeding 20.9 h, temperature 30.7° C.) and thereafter again gradually decreased (at 20° C. the supersaturation was about 1.70). The crystallization mass was further stirred at about 20° C. A pressure filter, Larox type PF 0.1 H2, was employed to separate the crystal fraction from the crystallization mass. Samples (à 20–200 g) were taken from the crystallization mass at different times to separate the mother liquor, and stirring of the remainder of the crystallization mass was continued. Prior to the filtration of the crystallization mass, its temperature was increased to about 30° C. to decrease the viscosity.

74.3 hours from the seeding, the viscosity of the sample of crystallization mass was 66 Pas at about 30° C. The sample of crystallization mass was filtered with the above-mentioned Larox pressure filter, initially using a filtering pressure of 13 bar for 15 minutes, and thereafter a filtering pressure of 14.5 bar for five minutes. The crystal cake obtained had a thickness of about 2.5 cm. The dry substance yield in the crystallization mass prior to filtration was 20.2% and the xylose yield 50.4%. The analysis results are shown in Table 1 below, in which the terms and abbreviations have the following meanings:

Begin=sample of crystallization mass before beginning of cooling pH 5%=pH determined from sample diluted with water to RDs 5%

Cond.=conductivity determined from sample diluted to RDs 5%

Ash=ash content calculated from conductivity by using sucrose coefficient for sulphate ash Filtr.=crystallization mass supplied to filter.

The tests carried out showed that the xylose yield and purity were influenced by the stirring time of the crystallization mass in the nucleation zone (in this case, in a temperature range of about 20–30° C.). The xylose purity of the filtered crystal fraction was 83.8% at best (the time from seeding was 76.2 h; the viscosity of the crystallization mass was 66 Pas at 29.8° C.; filtration at 14.5 bar for five minutes), the xylose purity of the filtrate, i.e. run-off, was 18.1% at its lowest (time from seeding 220 h; viscosity of crystallization mass 59 Pas at 29.2° C.; filtration at 13–14 bar for 15 minutes). The xylose yield into crystals of the crystallizable mass was 63.2% at its highest (time from seeding 49.3 h). The filtration effective yield was from about 57–67%.

TABLE 1

Analysis of xylose crystallization

| | Begin | Filtr. Mass | Crystal cake | Run-off Filtrate |
|---|---|---|---|---|
| Dry substance content (DS), g/100 g | 89.2 | 88.0 | 93.3 | 79.2 |
| pH (solution 30–50%) | 2.5 | 2.6 | 2.6 | 2.6 |
| pH 5% | 2.9 | 2.9 | 3.0 | 3.0 |
| Cond. (from solution having 5% of dry substances), mS/cm | 2.22 | 2.20 | 1.16 | 2.64 |
| Ash, % | 3.99 | 3.96 | 2.08 | 4.39 |
| Colour, ICUMSA | 14000 | 15000 | 6800 | 19600 |
| Carbohyrdate content, % on dry substance (DS) | | | | |
| glucose | 2.7 | 2.6 | 1.8 | 3.2 |
| xylose | 40.1 | 40.5 | 74.5 | 22.4 |
| galact. + rhamn. | 3.7 | 3.8 | 1.8 | 4.6 |
| arabinosa | 0 | 0 | 0 | 0 |
| mannose | 3.5 | 0.7 | 0.3 | 4.5 |

EXAMPLE 2

Crystallization of Xylose

Where not otherwise stated, the procedure was similar to that of Example 1. The xylose-containing solution to be treated (20.5 kg) had been obtained by combining a xylose fraction obtained from a magnesium-base sulphite cooking liquor of beechwood by chromatographic separation and an aqueous solution of a crystal cake obtained from previous nucleation crystallization tests. The solution had a dry substance content (DS) of 62.7% and a xylose purity of 53.0%.

The solution was evaporated to a dry substance content (DS) of 89.7%. 13.4 kg of the crystallization mass obtained was transferred into a 10 l crystallizer. Seeding at 65° C. with 5 g of ground xylose (crystal size 50 μm) at a supersaturation of 1.96, and linear cooling from 65° C. to about 20° C. in about 17 hours. During that time, the supersaturation decreased to 1.71, and it remained in the range 1.70–1.76 when the crystallization mass was stirred in the nucleation zone (at a temperature of 20–22° C.). After 21.5 hours from seeding (viscosity 183 Pas at 22° C.), the crystallization mass was heated to 32° C. and filtered with a pressure filter (15 minutes, filtration pressure 13.5 bar).

The dry substance yield into crystals of the crystallization mass prior to filtration was 38.1% and the xylose yield 72.1%. The filtration effective yield was 63%. The analysis results are shown in Table 2 below, in which the terms and abbreviations have the same meanings as in Example 1.

TABLE 2

Analysis of xylose crystallization

| | Begin | Filtr. | Crystal cake | Run-off |
|---|---|---|---|---|
| Dry substance content (DS), g/100 g | 89.7 | 89.9 | 94.8 | 83.7 |
| pH 5% | 3.1 | 3.1 | 3.2 | 3.0 |
| Cond. (from solution having 5% of dry substances), mS/cm | 2.22 | 2.22 | 1.23 | 3.02 |
| Ash, % | 4.00 | 4.00 | 2.22 | 5.44 |
| Colour, ICUMSA | 13000 | 13400 | 700 | 20000 |
| Carbohyrdate content, % on dry substance (DS) | | | | |
| glucose | 2.2 | 2.3 | 1.2 | 3.1 |
| xylose | 52.5 | 52.8 | 78.0 | 29.2 |
| galact. + rhamn. | 3.2 | 3.2 | 1.5 | 4.3 |
| arabinosa | 0 | 0 | 0 | 0 |
| mannose | 2.6 | 2.6 | 1.23 | 3.8 |

EXAMPLE 3

Crystallization of Betaine

The solution to be treated was a run-off obtained by crystallizing betaine from the betaine fraction of chromatographic separation of molasses (cf. the above Finnish Patent 77 845; international application WO 81/02420). The dry substance content (DS) of this solution was 63.4 g/100 g, and its analysis results are shown in Table 3 below.

12.3 kg of this solution was evaporated under subatmospheric pressure in a rotating evaporator at a temperature in excess of 80° C. to a dry substance content (DS) of 90.2 g/100 g (the analysis results are shown in Table 3). The linear cooling programme of the concentrated solution thus obtained was started in a 6 l crystallizer from 95° C., the supersaturation of the solution then being 1.74. During the entire crystallization, the crystallization mass was vigorously stirred. After 6.2 hours, the temperature was 76.5° C., the supersaturation was 3.18, and no crystallization had taken place. At that point, 0.6 g of ground betaine monohydrate was added, and nucleation started. Samples (à 20–200 g) were taken from the crystallization mass at different times to separate the mother liquor, and stirring of the crystallization mass was continued. The cooling was continued linearly to 30° C. (time from seeding with betaine monohydrate 31.1 h), the supersaturation then being 2.43. The crystallization mass was stirred at this temperature for 3.8 hours, whereafter the temperature was raised to 35° C. in 0.8 hours (the viscosity was then 113 Pas) and further to 37° C. in 0.9 hours. At that point, the viscosity was 84 Pas, and the crystal fraction was separated from the crystallization mass with the Larox pressure filter of Example 1 employing a filtration pressure of 14–15 bar for 30 minutes. A dry crystal cake having a thickness of 8 mm was obtained.

The analysis results are shown in Table 3 below, in which the terms and abbreviations have the same meanings as in the previous examples, except that the color has been measured at pH 7. Furthermore, the term "Solution" employed in the first column refers to the raw material solution prior to evaporation.

The betaine yield into the crystal fraction was 37.7% of the betaine contained in the original solution, and the inositol yield into the crystal fraction was 55.5% of the inositol contained in the solution.

The filtration effective yield of betaine was 24% whereas the filtration effective yield of inositol was 40%.

The tests carried out showed that the betaine and inositol yield and purity were influenced by the stirring time of the crystallization mass in the nucleation zone. The combined betaine and inositol purity of the filtered crystal fraction was 87.1% at best (the time from seeding was 37 h). The betaine purity of the filtrate, i.e. run-off, separated from the crystal mass was 33.3% at its lowest and the inositol purity was 7.0 (time from seeding 31 h).

TABLE 3

Analysis of betaine crystallization

| | Solution | Begin | Filtr. | Crystal cake | Run-off |
|---|---|---|---|---|---|
| Dry substance content (DS), g/100 g | 63.4 | 90.2 | 91.9 | 91.1 | 89.8 |
| pH (solution 30–50%) | 9.9 | 10.0 | 10.0 | 10.0 | 10.0 |
| pH 5% | 9.8 | 9.8 | 9.8 | 9.6 | 9.7 |
| Cond. (from solution having 5% of dry substances), mS/cm | 2.50 | 2.49 | 2.49 | 1.00 | 3.00 |
| Ash, % | 4.50 | 4.48 | 4.48 | 1.81 | 5.40 |
| Colour, ICUMSA | 127500 | 139400 | 132500 | 42400 | 165000 |
| Carbohyrdate content, % on dry substance (DS) | | | | | |
| raffinose | 0.1 | 0.0 | 0.0 | 0.0 | 0.0 |
| sucrose | 1.8 | 1.8 | 1.8 | 0.7 | 2.2 |
| other disaccharides | 0.5 | 0.7 | 0.7 | 0.0 | 0.4 |
| glucose | 5.4 | 5.5 | 5.6 | 1.7 | 6.6 |
| fructose | 7.9 | 7.9 | 8.3 | 2.7 | 9.7 |
| inositol | 11.1 | 11.2 | 11.2 | 21.6 | 7.0 |
| glycerol | 8.1 | 8.3 | 8.8 | 3.5 | 9.7 |
| betaine | 46.8 | 47.4 | 47.3 | 65.5 | 40.5 |

EXAMPLE 4

Crystallization of Betaine

The solution to be treated was that of Example 3. 13.6 kg of this solution was evaporated under subatmospheric pressure in a rotating evaporator at a temperature slightly below 80° C. to a dry substance content (DS) of 97.6 g/100 g. In that situation, seeding was spontaneous, the supersaturation being 3.69. 7 kg of crystallization mass was transferred into a 6 l crystallizer to 95° C., and 150 ml of water at about 90° C. was added thereto. The crystallization mass thus prepared was cooled down linearly by vigorous stirring in 10 hours from 95° C. to 70° C. The crystallization mass was stirred at this temperature for about nine hours (overnight), whereafter it was cooled for about five hours to a constant temperature of 36° C., at which it was stirred for about 62 hours. The viscosity of the crystallization mass was 15.6 Pas at 70° C., 55 Pas at 45° C., and after stirring of 90 hours (from seeding) 347 Pas at 36° C. After the above stirring time, the temperature of the crystallization mass was first raised to 48° C. (viscosity 75 Pas), and thereafter the crystal fraction was separated from the crystallization mass at 45° C. (viscosity 116 Pas, supersaturation 17.87) with the Larox pressure filter of Example 1 employing a filtration pressure of 14.5 bar for 30 minutes. A sufficiently dry crystal cake having a thickness of 8 mm was obtained.

The analysis results are shown in Table 4 below, in which the terms and abbreviations correspond to those of Example 3.

The betaine yield into the crystal fraction was 47.0% of the betaine contained in the original solution, and the inositol yield was 60.5% of the inositol contained in the solution.

The true yield of inositol was 60.5%, and the true yield of betaine was 47%. The filtration effective yield of inositol was 40% and the filtration effective yield of betaine was 30%.

The combined betaine and inositol purity of the filtered crystal fraction was 77.3% at best, and the betaine purity of the run-off was 30.9% at its lowest and the inositol purity was 6.5% at its lowest.

TABLE 4

Analysis of betaine crystallization

| | Begin | Filtr. | Crystal cake | Run-off |
|---|---|---|---|---|
| Dry substance content (DS), g/100 g | 97.6 | 95.5 | 96.9 | 93.6 |
| pH 5% | 9.9 | 9.9 | 9.7 | 9.9 |
| Cond. (from solution having 5% of dry substances), mS/cm | 2.50 | 2.54 | 1.32 | 3.34 |
| Ash, % | 4.50 | 4.57 | 2.38 | 6.01 |
| Colour, ICUMSA | 130000 | 135000 | 30900 | 183000 |
| Carbohyrdate content, % on dry substance (DS) | | | | |
| raffinose | 0.0 | 0.0 | 0.0 | 0.0 |
| sucrose | 1.6 | 1.7 | 0.7 | 2.3 |
| other disaccharides | 0.4 | 0.0 | 0.0 | 0.6 |
| glucose | 5.8 | 6.2 | 2.3 | 8.2 |
| fructose | 7.6 | 9.3 | 3.6 | 11.6 |
| inositol | 10.4 | 11.6 | 17.1 | 6.5 |
| glycerol | 7.0 | 7.7 | 3.3 | 9.7 |
| betaine | 43.6 | 48.9 | 60.2 | 35.1 |

EXAMPLE 5

Crystallization of Xylitol

The solution to be treated was a run-off obtained from the crystallization of xylitol. It was evaporated with a rotating evaporator at a pressure of 40 mbar at 70° C. to a dry substance content (RDs determined by reading tables of xylitol) of 93.8 g/100 g.

12.3 kg of the obtained crystallization mass was transferred into a 10 l crystallizer to a temperature of 50° C. (s=1.5), seeded with 10 g of ground xylitol, and cooled down to 25° C. in 10 hours. About three hours after the temperature of 25° C. had been reached, the crystallization mass had a viscosity of 61.5 Pas (s=3.9). The crystallization mass was stirred at this temperature for a total of 8 hours, whereafter the temperature was further lowered (temperature of cooling water 15° C.). After about three hours, the crystallization mass had a temperature of 16° C. (s=4.9). The crystallization mass was stirred at this bath temperature for 18 hours, whereafter the viscosity was 250 Pas (s=3.0) when the crystallization mass had a temperature of 18° C.

Thereafter the temperature of the crystallization mass was raised to 25° C. in about three hours (the viscosity was then 81.5 Pas (s=2.1)) and further to 28° C. in about two hours.

At that point, the crystallization mass had a viscosity of 59.5 Pas (s=2.0), and the crystal fraction was separated from the crystallization mass with the Larox pressure filter of the previous examples employing a filtration pressure of 12 bar for 15 minutes. The compression was removed before a proper crystal cake had been formed.

The analysis results are shown in Table 5 below, in which the terms and abbreviations have the same meanings as in Example 3.

The xylitol yield into the crystal fraction was 67% of the xylitol contained in the initial solution whereas the true yield of xylitol was 67% and the filtration effective yield was 31%.

TABLE 5

Analysis of xylitol crystallization

| | Begin | Filtr. | Crystal cake | Run-off[1)] |
|---|---|---|---|---|
| Dry substance content (RDs), g/100 g | 9.38 | 92.9 | 92.5 | 17.2[2)] |
| Carbohydrate content, % on dry substance (RDs) | | | | |
| monosaccharides | 4.4 | 4.5 | 3.5 | 5.8 |
| glycerol | 4.0 | 4.1 | 3.4 | 4.8 |
| mannitol | 12.0 | 12.0 | 10.7 | 14.3 |
| rhamnitol | 0.9 | 0.9 | 0.9 | 1.1 |
| xylitol | 38.0 | 38.1 | 44.12 | 29.7 |
| sorbitol | 8.5 | 7.6 | 7.8 | 9.8 |
| others (undetected substance) | 32.2 | 32.9 | 29.6 | 34.5 |

[1)]The run-off sample was separated from the crystallization mass supplied to the filter with a laboratory centrifuge (4500 rpm).
[2)]The sample was diluted with water, and the initial dry substance content was not determined.

EXAMPLE 6

Crystallization of Sucrose

The solution to be treated was molasses obtained from a beet sugar factory. The solution was evaporated in a rotating evaporator to a dry substance content (RDs determined by reading tables of sucrose) of 90.3 g/100 g.

14.5 kg of the crystallization mass obtained was transferred into a 10 l crystallizer to a temperature of 62° C. and seeded with 10 g of ground sucrose, and cooled down with simultaneous vigorous stirring to 40° C. in 40 hours. About 25 hours after the temperature of 40° C. had been reached, the crystallization mass had a viscosity of 550 Pas. The temperature of the crystallization mass was raised to 53° C. in about five hours, the viscosity then being 111 Pas, and the crystal fraction was separated with a Larox pressure filter employing a filtration pressure of 12 bar for 15 minutes. The compression was removed before a sufficiently dry crystal fraction had been formed.

The analysis results are shown in Table 6 below, in which the terms and abbreviations have the same meanings as in Example 3.

The filtration effective yield of sucrose was 18%.

TABLE 6

Analysis of sucrose crystallization

| | Begin | Filtr. | Run-off | Run-off[1)] |
|---|---|---|---|---|
| Dry substance content (RDs), g/100 g | 90.3 | 91.0 | 81.9 | — |
| Carbohydrate content, % on dry substance (RDs) | | | | |
| raffinose | 2.2 | 2.2 | 2.3 | 2.3 |
| sucrose | 60.0 | 57.8 | 55.1 | 54.0 |
| betaine | 5.6 | 5.9 | 6.2 | 6.4 |

[1)]The run-off sample separated from the crystallization mass with a laboratory centrifuge (4500 rpm).

EXAMPLE 7

Crystallization of Xylitol

The starting material was a run-off obtained from previous crystallizations of xylitol. It was filtered by a laboratory vacuum filter. The purity of xylitol on dry substance basis (RDs) in the obtained solution was increased to about 46% by adding pure crystalline xylitol. The solution was evaporated with a laboratory vacuum evaporator at a bath temperature of 60–70° C. during 6 hours to a dry substance content (RDs) of 94.1 g/100 g.

13.58 kg (a volume of 10 l) of the crystallization mass thus obtained was transferred into a 10 l crystallizer to a bath temperature of 50° C. and stirred for twenty minutes. At that time, the crystallization mass had a temperature of 51° C. and the supersaturation was 1.7. The crystallization mass was then seeded with 10 g of ground xylitol and subjected to linear cooling from 50° C. to 23° C. (temperature of cooling water) within 15 hours. At the end of this cooling period, the crystallization mass had a temperature of 24° C., a viscosity of 110 Pas, and a supersaturation of 3.2.

The crystallization mass was further stirred at this temperature for about 2 hours, whereafter its temperature was lowered to 20° C. during about 3 hours (the viscosity was then 200 Pas; supersaturation 3.5) and further to 16° C. during about 3 hours. The crystallization mass then had a viscosity of 345 Pas. Stirring of the crystallization mass at approximately this temperature (cooling water at a constant temperature of 15° C.) was continued for 42 hours. A sample taken after 17 hours stirring at this temperature had a viscosity of 400 Pas and a supersaturation of 4.0. At the end of this stirring period, the viscosity of the crystallization mass was 407 Pas.

Thereafter the temperature of the crystallization mass was raised to 20° C. in half an hour (the viscosity was then 256 Pas) and further to 23° C. in three hours. At that point, the crystallization mass had a viscosity of 198 Pas. A sample of the crystallization mass was taken at this point, and a run-off sample was separated therefrom by a laboratory centrifuge.

The crystallization mass was then removed from the crystallizer, water was added in an amount of 5% by weight of the crystallization mass to lower the viscosity, and the crystal fraction was separated with the Larox pressure filter of the previous examples employing a filtration pressure of 15 bar for 30 minutes.

The analysis results are shown in Table 7 below, in which the terms and abbreviations have the same meanings as in Example 5.

The xylitol yield into the crystal cake during the Larox filtration was 57% of the xylitol contained in the initial solution. The true yield of the xylitol was 57% and the filtration effective yield was 47%.

TABLE 7

Analysis of xylitol crystallization

| | End | Filtr. | Crystal cake | Run-off[1)] | Run-off[2)] |
|---|---|---|---|---|---|
| Dry substance content (RDs), g/100 g | 93.9 | 89.4 | 94.3 | 77.7 | — |
| Carbohydrate content, % on dry substance (RDs) | | | | | |
| glycerol | 5.1 | 4.2 | 2.3 | 5.3 | 6.3 |
| mannitol | 10.8 | 10.2 | 5.5 | 14.4 | 16.8 |
| rhamnitol | 0.9 | 0.9 | 0.4 | 1.3 | 1.4 |
| xylitol | 45.4 | 46.3 | 71.8 | 30.4 | 23.1 |
| sorbitol | 7.0 | 7.8 | 4.6 | 10.2 | 11.6 |
| others (monosaccharides and undetected substance) | 30.8 | 30.6 | 15.1 | 38.4 | 42.2 |

End = crystallization mass in the end of the crystallization
[1)]The run-off from the Larox pressure filter
[2)]The run-off sample separated from the crystallization mass with a laboratory centrifuge (4500 rmp).

EXAMPLE 8

Crystallization of Xylitol

The same starting material was used as in Example 7. The purity of xylitol in the filtered solution was increased to about 47% by adding pure crystalline xylitol. The solution was evaporated with a rotating evaporator at a bath temperature of 70° C. to a dry substance content (RDs) of 94.4 g/100 g.

13.52 kg of the crystallization mass thus obtained was transferred into a 10 1 crystallizer. As in Example 7, the crystallization mass was effectively stirred during the entire procedure. The crystallization mass was seeded at a temperature of 56° C. (s=1.4) with 10 g of ground xylitol and subjected to linear cooling. In approximately 26 hours, the crystallization mass had reached a temperature of 20.5° C. The crystallization mass was stirred at this temperature for 42 hours, after which time the supersaturation was 3.6. The viscosity of the crystallization mass at the end of this stirring period was 280 Pas.

Thereafter, the temperature of the crystallization mass was raised to 25° C. in about two hours (the viscosity was then 176 Pas; s=3.1) and stirring at this temperature was continued for one hour. A sample of the crystallization mass was taken at this point, and a run-off sample was separated therefrom by a laboratory centrifuge.

Part of the crystallization mass was then removed from the crystallizer, and water was added thereto in an amount of 5% by weight to lower the viscosity, which was 28 Pas after the addition of water. The crystal fraction was separated from this part with the Larox pressure filter of the previous examples employing a filtration pressure of 16 bar for 1 h 15 min.

Ethanol was added to the remainder of the crystallization mass in the crystallizer in an amount of 5% by weight of the crystallization mass, which was stirred at 25° C. for about half an hour. The crystallization mass was then removed from the crystallizer and filtered in the same way as described above for the first part of the crystallization mass.

The analysis results are shown in Table 8 below, in which the terms and abbreviations have the same meanings as in Example 5, Filtration I refers to the Larox filtration with an addition of water, and Filtration II to the Larox filtration with an addition of ethanol.

The xylitol yield into the crystal cake from the first filtration (with the addition of water) was 68% and from the second filtration (with the addition of ethanol) 74% of the xylitol contained in the initial solution. True yield of xylitol was 68% and the filtration effective yield was 60% in the first filtration.

TABLE 8

Analysis of Xylose Crystallization

| | Begin | Filter Mass | Crystal Cake | Run-off[3] | Run-off[4] |
|---|---|---|---|---|---|
| Carbohydrate content, % on dry substance (RDs) | | | | | |
| Filtration I | | | | | |
| Dry substance content (DS), g/100 g | 94.0 | 89.9 | 94.2 | 82.4 | — |
| glycerol | 2.1 | 3.7 | 3.0 | 3.4 | 2.3 |
| mannitol | 8.7 | 9.4 | 4.3 | 13.4 | 15.1 |
| rhamnitol | 0.7 | 0.5 | 1.1 | 0.7 | 0.9 |
| xylitol | 49.5 | 46.7 | 75.2 | 28.4 | 22.9 |
| sorbitol | 5.2 | 7.4 | 10.1 | 10.4 | 10.6 |
| others (monosaccharides and undetected substance) | 33.8 | 32.3 | 6.3 | 43.7 | 48.2 |
| Filtration II | | | | | |
| Dry substance content (RDS), g/100 g | 94 | 89 | 94.7 | 79.5 | — |
| glycerol | 2.1 | 3.3 | — | — | — |
| mannitol | 9.7 | 9.1 | 4.1 | 12.6 | — |
| rhamnitol | 0.7 | 0.5 | 0.0 | 0.8 | — |
| xylitol | 49.5 | 45.2 | 74.5 | 24.9 | — |
| sorbitol | 5.2 | 7.2 | 3.5 | 9.5 | — |
| others (monosaccharides and undetected substance) | 32.8 | 34.7 | 17.9 | 52.2 | — |

[3]The run-off from the Larox pressure filter.
[4]The run-off sample separated from the crystallization mass with a laboratory centrifuge (4500 rpm).

EXAMPLE 9

Crystallization of Sucrose

The raw material to be treated was molasses obtained from a beet sugar factory. The molasses was filtered and the filtrate evaporated under reduced pressure to a dry substance content of Bx 93.0.

100 l of the crystallization mass obtained was transferred into a 100 l crystallizer, seeded with 100 g of ground sucrose at 78.5° C. and cooled down with simultaneous effective stirring to 50° C. in about 60 hours. The viscosity of the crystallization mass was then about 800 Pas, and stirring was continued keeping the temperature substantially unchanged. About 170 hours after the temperature of 50° C. had been reached, the crystallization mass had a viscosity of about 670 Pas. After 172 hours at about 50° C., the temperature of the crystallization mass was raised to about 60° C. in about five hours, and after about 24 hours at this temperature, the crystallization mass had a viscosity of about 280 Pas. About 60 hours after reaching the temperature of 60° C., the crystallization mass had a viscosity of 241 Pas.

The viscosity was further lowered by an addition of water (2% by weight), and the crystal fraction was separated with a Larox pressure filter employing a filtration pressure of 16 bar for 60 minutes. The temperature of the Larox feed (filter.) was rapidly raised to 69° C. just before filtration.

The analysis results are shown in Table 9 below, in which the terms and abbreviations have the same meanings as in the preceding examples, unless otherwise indicated. The true yield of sucrose was 52% and the filtration effective yield was 28%.

TABLE 9

Analysis of sucrose crystallization

| | Feed syrup | Begin | Filtr. | Crystal cake | Run-off[1)] |
|---|---|---|---|---|---|
| Dry substance content Brix | 77.0 | 92.7 | 90.8 | 93.6 | — |
| Carbohydrate content, % on dry substance (RDs) | | | | | |
| raffinose | 2.5 | 2.6 | 3.5 | 1.8 | 3.7 |
| sucrose | 60.9 | 61.5 | 61.0 | 70.8 | 52.9 |
| betaine | 5.2 | 5.3 | 5.4 | 3.2 | 5.8 |

[1)]The run-off sample separated from the crystallization mass with a laboratory centrifuge (4500 rpm).

EXAMPLE 10

Crystallization of Sucrose

The raw material to be treated was the same molasses as in Example 9, and it was initially treated as described in Example 9, except that some glycerol fraction was added to the filtered solution before evaporation. A glycerol fraction obtained from a chromatographic fractionation of vinasse was used for the glycerol addition, and the added amount of glycerol was 10% of the dry substance contained in the filtered solution.

A 100 l crystallizer was charged with the crystallization mass thus obtained (Bx 92.0), and the crystallization mass was seeded with 100 g of ground sucrose at 76° C. The crystallization mass was cooled down with simultaneous effective stirring to about 50° C. in about 60 hours. The viscosity of the crystallization mass was then about 210 Pas, and stirring was continued at this temperature for 11 hours. Thereafter, the temperature was lowered to 46.5° C., whereby the viscosity first increased to about 280 Pas and gradually decreased to about 220 Pas in 145 hours at this temperature.

The temperature was then gradually raised to 53° C. (viscosity 120 Pas) and after about 30 hours at this temperature, the crystal fraction was separated with a Larox pressure filter employing a filtration pressure of 16.2 bar for 65 minutes.

The analysis results are shown in Table 10 below, in which the terms and abbreviations have the same meanings as in the preceding examples.

Sucrose yield to the crystal cake during the Larox filtration was 35% from the sucrose of the original feed syrup, and the filtration effective yield was 28%.

TABLE 10

Analysis of sucrose crystallization

| | Begin | Filtr. | Crystal cake | Run-off[1)] | Run-off[2)] |
|---|---|---|---|---|---|
| Dry substance content Brix | 92.0 | 92.2 | 95.2 | 90.0 | — |
| Carbohydrate content, % on dry substance (RDs) | | | | | |
| raffinose | 2.6 | 2.6 | 1.1 | 3.2 | 3.1 |
| sucrose | 54.8 | 52.2 | 80.5 | 46.7 | 44.1 |
| glucose | 2.8 | 2.8 | 1.9 | 3.2 | 3.2 |
| fructose | 0.6 | 0.5 | 0.9 | 0.5 | 0.6 |
| inositol | 0.4 | 0.3 | 0.1 | 0.3 | 0.4 |
| glycerol | 8.3 | 8.2 | 2.9 | 9.8 | 9.5 |
| betaine | 5.1 | 5.0 | 1.8 | 6.1 | 5.8 |

[1]The run-off from the Larox pressure filter.
[2]The run-off sample separated from the crystallization mass with a laboratory centrifuge (4500 rpm).

EXAMPLE 11

Crystallization of Sucrose

The raw material to be treated was molasses obtained from a cane sugar factory. The molasses was evaporated under reduced pressure to a dry substance content of DS 88.1 (determined by Karl-Fisher method).

12.3 kg of the crystallization mass obtained was transferred into a 10 l crystallizer, seeded with 10 g of ground sucrose at about 75° C. and cooled down with simultaneous effective stirring to 50° C. in about 60 hours. The viscosity of the crystallization mass was then about 860 Pas, and stirring was continued keeping the temperature substantially unchanged. Eleven days after the temperature of 50° C. had been reached, the crystallization mass had a viscosity of about 800 Pas, first run-off sample was separated from the crystallization mass with a laboratory centrifuge, and 50 ml water was mixed into the mass to reduce viscosity.

Four days after the water addition, the crystallization mass had a viscosity of about 510 Pas and temperature 50° C., second run-off sample was separated from the crystallization mass with a laboratory centrifuge, and 200 ml water was mixed into the mass to reduce viscosity.

Four days after the 200 ml water addition, the viscosity was further lowered by raising the temperature of the crystallization mass to about 60° C. in about five hours. After about an hour at this temperature, the crystallization mass had a viscosity of about 75 Pas and a crystal fraction was separated with a Larox pressure filter employing a filtration pressure of 16 bar for 60 minutes. Filtration rate was slow. The filter cloth was Tamfelt 71-2209-L1 with pore size about 17 micrometer.

The analysis results are shown in Table 11 below, in which the terms and abbreviations have the same meanings as in the preceding examples, unless otherwise indicated.

The filtration effective yield of sucrose was 25%.

TABLE 11

Analysis of sucrose crystallization

| | Begin | 1st Run-off[1)] | 2nd Run-off[1)] | Run-off[2)] |
|---|---|---|---|---|
| Dry substance content DS, % w/w | 88.1 | 39.6[1] | 45.7[3] | 25.7[3] |
| Carbohydrate content, % on dry substance (RDs) | | | | |
| raffinose | 1.2 | 1.4 | 1.3 | 1.4 |
| sucrose | 43.0 | 36.0 | 38.8 | 41.4 |
| glucose | 3.6 | 2.2 | 2.2 | 2.1 |
| fructose | | | | |

[1)]The run-off sample separated from the crystallization mass with a laboratory centrifuge (4500 rpm).
[2)]The run-off from the Larox pressure filter.
[3]The DS is measured after dilution of the sample

EXAMPLE 12

Crystallization of Sucrose

The raw material to be treated was the same molasses as in Example 11, except that some sucrose was added before evaporation to rise the purity of the feed syrup to about 58%/DS. The syrup was evaporated under reduced pressure to a dry substance content of DS 89.7.

8.4 kg of the crystallization mass obtained was transferred into a 6 l crystallizer, seeded with 8 g of ground sucrose at about 75° C. and cooled down with simultaneous effective stirring to 50° C. in about 60 hours. The viscosity of the crystallization mass was then about 900 Pas, and 60 ml water was mixed into the mass to reduce viscosity, and stirring was continued keeping the temperature substantially unchanged. Eight days after the temperature of 50° C. had been reached, the crystallization mass had a viscosity of about 720 Pas, first run-off sample was separated from the crystallization mass with a laboratory centrifuge, and 20 ml water was mixed into the mass.

Four days after the water addition, the crystallization mass had a viscosity of about 610 Pas and temperature 50° C., and 1 kg of a 63% glycerol/water solution was mixed into the mass to reduce viscosity.

Five days after the glycerol addition, the viscosity of the crystallization mass was 17 Pas and temperature 50° C. After one day mixing at this temperature, a crystal fraction was separated with a Larox pressure filter employing a filtration pressure of 16 bar for 60 minutes. The filter cloth was the same as in Example 11.

The analysis results are shown in Table 12 below, in which the terms and abbreviations have the same meanings as in the preceding examples, unless otherwise indicated.

Sucrose yield to the crystal cake during the Larox filtration was about 45% from the sucrose of the feed syrup. The effective yield was 29%.

TABLE 12

Analysis of sucrose crystallization

| | Begin | Filtr. | Crystal cake | Run-off[1)] | 1st Run-off[2)] |
|---|---|---|---|---|---|
| Dry substance content DS, % w/w | 89.7 | 86.3 | 45.5[2] | 34.5[2] | 47.9[3] |
| Carbohydrate content, % on dry substance (DS | | | | | |
| raffinose | 1.0 | 1.1 | 0.6 | 1.1 | 1.4 |
| sucrose | 57.3 | 50.2 | 66.3 | 41.8 | 37.5 |
| glucose | 2.7 | 1.5 | 1.0 | 1.9 | 2.3 |
| fructose | 6.3 | 5.3 | 3.2 | 0.3 | 7.1 |
| glyserol | 0 | 11.7 | 7.2 | 13.4 | 0 |

[1)]The run-off from the Larox pressure filter
[2)]The run-off sample separated from the crystallization mass with a laboratory centrifuge (4500 rmp).
[3]The DS is measured after dilution of the sample

We claim:

1. A method for recovering a crystallize organic compound from a solution containing said compound, comprising crystallizing the said compound by way of nucleation from a solution having a viscosity of at least about 100,000 CP and a supersaturation of less than about 4 in respect of the compound to be recovered under conditions including continuous intermixing into and from high shear zones and a slow cooling rate of from about 10–100 hours effective to promote said nucleation without substantial crystal growth and recovering a crystalline mass.

2. The method of claim 1, wherein said crystalline mass has a final crystal size of 10 to 120 micrometers.

3. The method of claim 1, wherein the solution containing said crystallizable organic compound is brought to said supersaturated state by evaporation and said viscosity is achieved by cooling.

4. The method of claim 3, wherein cooling is carried out at a temperature range of 95°–20° C.

5. The method of claim 1, wherein nucleation is initiated by adding seed crystals of the crystallizable organic compound to be recovered to the solution during evaporation or cooling.

6. The method of claim 5, wherein said seed crystals are employed in an amount at least 10-fold in relation to full seeding.

7. The method of claim 1, wherein the viscosity of the suspension containing the supersaturated solution and crystals of the compound to be recovered is reduced immediately prior to the recovery of said crystalline mass.

8. The method of claim 7, wherein the viscosity is reduced by heating, diluting or both heating and diluting the suspension.

9. The method of claim 8, wherein the viscosity is reduced by diluting the suspension with a solvent without significantly dissolving the crystals.

10. The method of claim 9, wherein the viscosity is reduced by mixing steam into the suspension.

11. The method of claim 1, wherein the crystalline mass is recovered by filtration.

12. The method of claim 11, wherein the crystalline mass is recovered by pressure filtration.

13. The method of claim 1, wherein the solution containing said organic crystallizable compound is an aqueous solution.

14. The method of claim 1, wherein the organic compound to be recovered is a sugar, a sugar alcohol or other polyol, a sugar alcohol anhydride, a carbohydrate, a hydroxy acid, a salt of a hydroxy acid, an amino acid or a salt of an amino acid.

15. The method of claim 1, wherein the organic compound to be recovered is xylose, mannose, xylitol, mannitol, lactose, lactitol, sucrose, glucose, fructose, maltose, maltitol, isomaltose, isomaltulose, lactulose, α-D-glucopyranocyl (1→6)mannitol, α-D-glucopyranocyl(1→6) sorbitol, β-cyclodextrin, itaconic acid, citric acid, inositol, lactic acid, 1,4-anhydroglucitol, gluconates or glutamates.

16. The method of claim 15, wherein the organic compound to be recovered is xylose.

17. The method of claim 16, wherein said solution comprises from 30 to less than 70% xylose on a dry basis.

18. The method of claim 16, wherein the xylose solution has a supersaturation value of 1.4–4.0.

19. The method of claim 16, wherein the viscosity of the supersaturated solution containing xylose during nucleation is in the range from about 100 to about 1000 Pas.

20. The method of claim 16, wherein the viscosity of the supersaturated solution containing xylose is reduced prior to the recovery of crystals to 5–100 Pas.

21. The method of claim 1, wherein the organic crystallizable compound to be recovered is xylitol, sucrose or betaine.

22. The method of claim 1, wherein the solution containing said organic crystallizable compound is a biomass-derived aqueous solution or a fermentation solution.

23. The method of claim 22, wherein the biomass-derived aqueous solution is selected from the group consisting of molasses, vinasse, biomass hydrolysate and parts thereof, and concentrates obtained therefrom.

24. The method of claim 1, wherein the crystalline mass obtained is recrystallized by repeating said method.

25. A method for the recovery of crystallizable organic compounds from aqueous solutions thereof comprising:

(1) concentrating said aqueous solution to a dry substance content of at least 75 weight percent to provide a supersaturated solution of said crystallizable organic compound constituting a crystallization mass;

(2) subjecting said crystallization mass to conditions to maintain said crystallization mass in the nucleation zone therefor;

(3) and recovering crystalline product from said crystallization mass.

26. The method of claim 25 further comprising the step of incorporating nucleating seed crystals of said crystallizable organic compound in said supersaturated solution.

27. A method for recovering a crystallizable organic compound selected from the group consisting of a sugar, a sugar alcohol, a sugar alcohol anhydride, a carbohydrate, a hydroxy acid, a salt of a hydroxy acid, an amino acid, a salt of an amino acid and betaine from solutions containing said crystallizable organic compound, comprising crystallizing said crystallizable organic compound by way of nucleation from a solution having a viscosity sufficient to retard crystal growth of said organic compound and a supersaturation value at which nucleation is dominant and crystal growth is inhibited, said nucleation being carried out under conditions including continuous intermixing into and from high shear zones and a slow cooling rate of from about 10–100 hours effective to promote said nucleation without substantial crystal growth, and recovering a crystalline mass.

28. The method of claim 27 wherein said crystalline. mass has a final crystal size of 10–120 micrometers.

29. The method of claim 27, wherein the cooling is carried out at a temperature of 95°–20° C.

30. The method of claim 27, wherein nucleation is initiated by adding seed crystals of the compound to be recovered to the supersaturated solution during evaporation or cooling.

31. The method of claim 30, wherein the seed crystals are employed in an amount at least 10-fold in relation to full seeding.

32. The method of claim 27, wherein the viscosity of the suspension containing the supersaturated solution and crystals of the compound to be recovered is reduced immediately prior to the recovery of crystals.

33. The method of claim 27, wherein the viscosity is reduced by heating, diluting or both heating and diluting the suspension.

34. The method of claim 33, wherein the viscosity is reduced by diluting the suspension with a solvent without significantly dissolving the crystals.

35. The method of claim 33, wherein the viscosity is reduced by mixing steam into the suspension.

36. The method of claim 27, wherein the solution is an aqueous solution of the organic compound to be recovered.

37. The method of claim 27, wherein the organic compound to be recovered is selected from the group consisting of xylose, mannose, xylitol, mannitol, lactose, lactitol, sucrose, glucose, fructose, maltose, maltitol, isomaltose, isomaltulose, lactulose, α-D-glucopyranocyl(1→6) mannitol, α-D-glucopyranocyl(1→6)sorbitol, β-cyclodextrin, itaconic acid, citric acid, inositol, lactic acid, 1,4-anhydroglucitol, gluconates and glutamates.

38. The method of claim 27, wherein the organic compound to be recovered is xylose, betaine, sucrose or xylitol.

39. The method of claim 27, wherein the supersaturation of the solution in respect of the substance to be recovered during crystallization is in excess of 1.3.

40. The method of claim 39, wherein said supersaturation of the solution is from about 1.4 to about 4.

41. The method of claim 21, wherein the viscosity of the supersaturated solution during nucleation is in excess of 100 Pas.

42. The method of claim 41, wherein the viscosity is reduced to have a value below 100 Pas prior to the recovery of crystals.

43. The method of claim 27, wherein the solution containing an organic compound is a biomass-derived aqueous solution or a fermentation solution.

44. The method of claim 43, wherein the biomass-derived aqueous solution has been selected from molasses, vinasse, biomass hydrolysate and parts thereof and concentrates obtained therefrom.

* * * * *